United States Patent
Reynolds

(10) Patent No.: US 12,465,377 B2
(45) Date of Patent: Nov. 11, 2025

(54) TALAR IMPLANT

(71) Applicant: WRIGHT MEDICAL TECHNOLOGY, INC., Memphis, TN (US)

(72) Inventor: David G. Reynolds, Fairport, NY (US)

(73) Assignee: WRIGHT MEDICAL TECHNOLOGY, INC., Memphis, TN (US)

( * ) Notice: Subject to any disclaimer, the term of this patent is extended or adjusted under 35 U.S.C. 154(b) by 764 days.

(21) Appl. No.: 17/838,771

(22) Filed: Jun. 13, 2022

(65) Prior Publication Data

US 2022/0401229 A1 Dec. 22, 2022

Related U.S. Application Data

(60) Provisional application No. 63/211,225, filed on Jun. 16, 2021.

(51) Int. Cl.
| | |
|---|---|
| A61B 17/17 | (2006.01) |
| A61B 17/15 | (2006.01) |
| A61B 17/16 | (2006.01) |
| A61B 90/00 | (2016.01) |

(52) U.S. Cl.
CPC .......... *A61B 17/1775* (2016.11); *A61B 17/15* (2013.01); *A61B 17/1682* (2013.01); *A61B 2090/034* (2016.02)

(58) Field of Classification Search
CPC ... A61B 17/15; A61B 17/151; A61B 17/1682; A61B 17/17; A61B 17/1775; A61F 2/4202; A61F 2002/4207; A61F 2/4606
See application file for complete search history.

(56) References Cited

U.S. PATENT DOCUMENTS

| | | | |
|---|---|---|---|
| 3,839,742 | A | 10/1974 | Link |
| 3,872,519 | A | 3/1975 | Giannestras et al. |
| 3,886,599 | A | 6/1975 | Schlein |
| 3,889,300 | A | 6/1975 | Smith |
| 3,896,502 | A | 7/1975 | Lennox |
| 3,896,503 | A | 7/1975 | Freeman et al. |
| 3,975,778 | A | 8/1976 | Newton, III |
| 3,987,500 | A | 10/1976 | Schlein |
| 4,021,864 | A | 5/1977 | Waugh |
| 4,069,518 | A | 1/1978 | Groth, Jr. et al. |
| 4,156,944 | A | 6/1979 | Schreiber et al. |

(Continued)

FOREIGN PATENT DOCUMENTS

| | | |
|---|---|---|
| CA | 2836651 | 3/2016 |
| EP | 2124832 B1 | 8/2012 |

(Continued)

OTHER PUBLICATIONS

Partial European Search Report issued in connection with Application No. 22179220.3, Nov. 15, 2022, 15 pages.

(Continued)

*Primary Examiner* — Larry E Waggle, Jr.
(74) *Attorney, Agent, or Firm* — DUANE MORRIS LLP

(57) ABSTRACT

Provided is a prosthesis for ankle arthroplasty including a talar dome component configured to be attached to a talus bone. Also provided is a guide instrument for guiding a reamer to prepare a talus to receive the talar dome component.

5 Claims, 12 Drawing Sheets

(56) References Cited

U.S. PATENT DOCUMENTS

| | | |
|---|---|---|
| 4,166,292 A | 9/1979 | Bokros |
| 4,204,284 A | 5/1980 | Koeneman |
| 4,232,404 A | 11/1980 | Samuelson et al. |
| 4,309,778 A | 1/1982 | Buechel et al. |
| 4,470,158 A | 9/1984 | Pappas et al. |
| 4,755,185 A | 7/1988 | Tarr |
| 4,968,316 A | 11/1990 | Hergenroeder |
| 5,041,139 A | 8/1991 | Brånemark |
| 5,312,412 A | 5/1994 | Whipple |
| 5,326,365 A | 7/1994 | Alvine |
| 5,354,300 A | 10/1994 | Goble et al. |
| 5,423,825 A | 6/1995 | Levine |
| 5,476,466 A | 12/1995 | Barrette et al. |
| 5,601,563 A | 2/1997 | Burke et al. |
| 5,628,749 A | 5/1997 | Vendrely et al. |
| 5,634,927 A | 6/1997 | Houston et al. |
| 5,667,511 A | 9/1997 | Vendrely et al. |
| 5,674,223 A | 10/1997 | Cipolletti et al. |
| 5,735,904 A | 4/1998 | Pappas |
| 5,766,259 A | 6/1998 | Sammarco |
| 5,776,200 A | 7/1998 | Johnson et al. |
| 5,817,097 A | 10/1998 | Howard et al. |
| 5,824,106 A | 10/1998 | Fournal |
| 5,879,389 A | 3/1999 | Koshino |
| 5,885,299 A | 3/1999 | Winslow et al. |
| 5,888,203 A | 3/1999 | Goldberg |
| 5,897,559 A | 4/1999 | Masini |
| 5,935,132 A | 8/1999 | Bettuchi et al. |
| 6,002,859 A | 12/1999 | DiGioia, III et al. |
| 6,033,405 A | 3/2000 | Winslow et al. |
| 6,102,952 A | 8/2000 | Koshino |
| 6,183,519 B1 | 2/2001 | Bonnin et al. |
| 6,245,109 B1 | 6/2001 | Mendes et al. |
| 6,342,056 B1 | 1/2002 | Mac-Thiong et al. |
| 6,344,043 B1 | 2/2002 | Pappas |
| 6,409,767 B1 | 6/2002 | Pericé et al. |
| 6,436,146 B1 | 8/2002 | Hassler et al. |
| 6,478,800 B1 | 11/2002 | Fraser et al. |
| 6,520,964 B2 | 2/2003 | Tallarida et al. |
| 6,530,930 B1 | 3/2003 | Marino et al. |
| 6,610,067 B2 | 8/2003 | Tallarida et al. |
| 6,610,095 B1 | 8/2003 | Pope et al. |
| 6,620,168 B1 | 9/2003 | Lombardo et al. |
| 6,645,215 B1 | 11/2003 | McGovern et al. |
| 6,663,669 B1 | 12/2003 | Reiley |
| 6,673,116 B2 | 1/2004 | Reiley |
| 6,679,917 B2 | 1/2004 | Ek |
| 6,719,799 B1 | 4/2004 | Kropf |
| 6,824,567 B2 | 11/2004 | Tornier et al. |
| 6,852,130 B2 | 2/2005 | Keller et al. |
| 6,860,902 B2 | 3/2005 | Reiley |
| 6,863,691 B2 | 3/2005 | Short et al. |
| 6,875,222 B2 | 4/2005 | Long et al. |
| 6,875,236 B2 | 4/2005 | Reiley |
| 6,926,739 B1 | 8/2005 | O'Connor et al. |
| 6,939,380 B2 | 9/2005 | Guzman |
| 6,942,670 B2 | 9/2005 | Heldreth et al. |
| 7,001,394 B2 | 2/2006 | Gundlapalli et al. |
| 7,011,687 B2 | 3/2006 | Deffenbaugh et al. |
| 7,025,790 B2 | 4/2006 | Parks et al. |
| 7,163,541 B2 | 1/2007 | Ek |
| 7,238,190 B2 | 7/2007 | Schon et al. |
| 7,252,684 B2 | 8/2007 | Dearnaley |
| 7,314,488 B2 | 1/2008 | Reiley |
| 7,323,012 B1 | 1/2008 | Stone et al. |
| 7,476,227 B2 | 1/2009 | Tornier et al. |
| 7,481,814 B1 | 1/2009 | Metzger |
| 7,485,147 B2 | 2/2009 | Papps et al. |
| 7,534,246 B2 | 5/2009 | Reiley et al. |
| 7,534,270 B2 | 5/2009 | Ball |
| 7,615,082 B2 | 11/2009 | Naegerl et al. |
| 7,618,421 B2 | 11/2009 | Axelson, Jr. et al. |
| 7,625,409 B2 | 12/2009 | Saltzman et al. |
| 7,641,697 B2 | 1/2010 | Reiley |
| 7,678,151 B2 | 3/2010 | Ek |
| 7,713,305 B2 | 5/2010 | Ek |
| 7,717,920 B2 | 5/2010 | Reiley |
| 7,763,080 B2 | 7/2010 | Southworth |
| 7,803,158 B2 | 9/2010 | Hayden |
| 7,850,698 B2 | 12/2010 | Straszheim-Morley et al. |
| 7,896,883 B2 | 3/2011 | Ek et al. |
| 7,896,885 B2 | 3/2011 | Miniaci et al. |
| 7,909,882 B2 | 3/2011 | Stinnette |
| 7,963,996 B2 | 6/2011 | Saltzman et al. |
| 8,002,841 B2 | 8/2011 | Hasselman |
| 8,012,217 B2 | 9/2011 | Strzepa et al. |
| 8,034,114 B2 | 10/2011 | Reiley |
| 8,034,115 B2 | 10/2011 | Reiley |
| 8,048,164 B2 | 11/2011 | Reiley |
| 8,110,006 B2 | 2/2012 | Reiley |
| 8,114,091 B2 | 2/2012 | Ratron et al. |
| 8,167,888 B2 | 5/2012 | Steffensmeier |
| 8,172,850 B2 | 5/2012 | McMinn |
| 8,177,841 B2 | 5/2012 | Ek |
| 8,268,007 B2 | 9/2012 | Barsoum et al. |
| 8,303,667 B2 | 11/2012 | Younger |
| 8,313,492 B2 | 11/2012 | Wong et al. |
| 8,317,797 B2 | 11/2012 | Rasmussen |
| 8,323,346 B2 | 12/2012 | Tepic |
| 8,337,503 B2 | 12/2012 | Lian |
| 8,361,159 B2 | 1/2013 | Ek |
| 8,475,463 B2 | 7/2013 | Lian |
| 8,491,596 B2 | 7/2013 | Long et al. |
| 8,562,608 B2 * | 10/2013 | May ............... A61B 17/1764 |
| | | 606/88 |
| 8,808,303 B2 | 8/2014 | Stemniski et al. |
| 8,911,444 B2 | 12/2014 | Bailey |
| 9,011,451 B2 * | 4/2015 | Long ................ A61B 17/15 |
| | | 606/87 |
| 9,492,281 B2 | 11/2016 | Rouyer et al. |
| 9,907,561 B2 | 3/2018 | Luna et al. |
| 9,993,254 B2 * | 6/2018 | Loring .............. A61F 2/4202 |
| 10,034,678 B2 | 7/2018 | Park et al. |
| 10,039,558 B2 | 8/2018 | Park et al. |
| 10,206,688 B2 | 2/2019 | Park et al. |
| 10,940,012 B2 | 3/2021 | Sander et al. |
| 2002/0068977 A1 | 6/2002 | Jackson |
| 2002/0082607 A1 | 6/2002 | Heldreth et al. |
| 2002/0133164 A1 | 9/2002 | Williamson |
| 2002/0173853 A1 | 11/2002 | Corl, III et al. |
| 2003/0208280 A1 | 11/2003 | Tohidi |
| 2003/0236522 A1 | 12/2003 | Long et al. |
| 2004/0030399 A1 | 2/2004 | Asencio |
| 2004/0039394 A1 | 2/2004 | Conti et al. |
| 2004/0068322 A1 | 4/2004 | Ferree |
| 2004/0167631 A1 | 8/2004 | Luchesi et al. |
| 2004/0186585 A1 | 9/2004 | Feiwell |
| 2004/0216259 A1 | 11/2004 | Ponziani |
| 2004/0236431 A1 | 11/2004 | Sekel |
| 2005/0004676 A1 | 1/2005 | Schon et al. |
| 2005/0165408 A1 | 7/2005 | Puno et al. |
| 2005/0192674 A1 | 9/2005 | Ferree |
| 2006/0009857 A1 | 1/2006 | Gibbs et al. |
| 2006/0020345 A1 | 1/2006 | O'Connor et al. |
| 2006/0036257 A1 | 2/2006 | Steffensmeier |
| 2006/0116679 A1 | 6/2006 | Lutz et al. |
| 2006/0142870 A1 | 6/2006 | Robinson et al. |
| 2006/0235541 A1 | 10/2006 | Hodorek |
| 2006/0247788 A1 | 11/2006 | Ross |
| 2007/0038303 A1 | 2/2007 | Myerson et al. |
| 2007/0100346 A1 | 5/2007 | Wyss et al. |
| 2007/0112431 A1 | 5/2007 | Kofoed |
| 2007/0162025 A1 | 7/2007 | Tornier et al. |
| 2007/0173944 A1 | 7/2007 | Keller et al. |
| 2007/0173947 A1 | 7/2007 | Ratron |
| 2007/0213830 A1 | 9/2007 | Ammann et al. |
| 2007/0233129 A1 | 10/2007 | Bertagnoli et al. |
| 2007/0276400 A1 | 11/2007 | Moore et al. |
| 2007/0288030 A1 | 12/2007 | Metzger et al. |
| 2008/0015602 A1 | 1/2008 | Axelson |
| 2008/0097617 A1 | 4/2008 | Fellinger et al. |
| 2008/0103603 A1 | 5/2008 | Hintermann |
| 2008/0109081 A1 | 5/2008 | Bao et al. |
| 2008/0195233 A1 | 8/2008 | Ferrari et al. |

(56) References Cited

U.S. PATENT DOCUMENTS

| | | |
|---|---|---|
| 2008/0215156 A1 | 9/2008 | Duggal et al. |
| 2008/0287954 A1 | 11/2008 | Kunz et al. |
| 2008/0312745 A1 | 12/2008 | Keller et al. |
| 2009/0024131 A1 | 1/2009 | Metzger et al. |
| 2009/0043310 A1 | 2/2009 | Rasmussen |
| 2009/0054992 A1 | 2/2009 | Landes et al. |
| 2009/0082875 A1 | 3/2009 | Long |
| 2009/0105767 A1 | 4/2009 | Reiley |
| 2009/0105840 A1 | 4/2009 | Reiley |
| 2009/0182433 A1 | 7/2009 | Reiley et al. |
| 2009/0198341 A1 | 8/2009 | Choi et al. |
| 2009/0234360 A1 | 9/2009 | Alexander |
| 2009/0276052 A1 | 11/2009 | Regala et al. |
| 2010/0010493 A1 | 1/2010 | Dower |
| 2010/0023066 A1 | 1/2010 | Long et al. |
| 2010/0023126 A1 | 1/2010 | Grotz |
| 2010/0057216 A1 | 3/2010 | Gannoe et al. |
| 2010/0069910 A1 | 3/2010 | Hasselman |
| 2010/0076441 A1 | 3/2010 | May et al. |
| 2010/0198355 A1 | 8/2010 | Kofoed et al. |
| 2010/0241237 A1 | 9/2010 | Pappas |
| 2010/0305572 A1 | 12/2010 | Saltzman et al. |
| 2010/0318088 A1 | 12/2010 | Warne et al. |
| 2010/0331984 A1 | 12/2010 | Barsoum et al. |
| 2011/0029090 A1 | 2/2011 | Zannis et al. |
| 2011/0035018 A1 | 2/2011 | Deffenbaugh et al. |
| 2011/0035019 A1 | 2/2011 | Goswami et al. |
| 2011/0071645 A1 | 3/2011 | Bojarski et al. |
| 2011/0106268 A1 | 5/2011 | Deffenbaugh et al. |
| 2011/0125200 A1 | 5/2011 | Hanson et al. |
| 2011/0125275 A1 | 5/2011 | Lipman et al. |
| 2011/0125284 A1 | 5/2011 | Gabbrielli et al. |
| 2011/0152868 A1 | 6/2011 | Kourtis et al. |
| 2011/0152869 A1 | 6/2011 | Ek et al. |
| 2011/0166608 A1 | 7/2011 | Duggal et al. |
| 2011/0190829 A1 | 8/2011 | Duggal et al. |
| 2011/0218542 A1 | 9/2011 | Lian |
| 2011/0253151 A1 | 10/2011 | Tochigi et al. |
| 2011/0276052 A1 | 11/2011 | Hasselman |
| 2011/0295380 A1 | 12/2011 | Long |
| 2012/0010718 A1 | 1/2012 | Still |
| 2012/0046753 A1 | 2/2012 | Cook et al. |
| 2012/0053644 A1 | 3/2012 | Landry et al. |
| 2012/0083789 A1 | 4/2012 | Blakemore et al. |
| 2012/0109131 A1 | 5/2012 | Vasarhelyi et al. |
| 2012/0109326 A1 | 5/2012 | Perler |
| 2012/0130376 A1 | 5/2012 | Loring et al. |
| 2012/0136443 A1 | 5/2012 | Wenzel |
| 2012/0185057 A1 | 7/2012 | Abidi et al. |
| 2012/0191210 A1 | 7/2012 | Ratron et al. |
| 2012/0239045 A1 | 9/2012 | Li |
| 2012/0245701 A1 | 9/2012 | Zak et al. |
| 2012/0271430 A1 | 10/2012 | Arnett et al. |
| 2012/0277745 A1 | 11/2012 | Lizee |
| 2013/0041473 A1 | 2/2013 | Rouyer et al. |
| 2013/0116797 A1 | 5/2013 | Coulange et al. |
| 2014/0276853 A1 | 9/2014 | Long et al. |
| 2015/0320567 A1 | 11/2015 | Terrill et al. |
| 2016/0135815 A1 | 5/2016 | Loring et al. |
| 2016/0262903 A1 | 9/2016 | West |
| 2018/0303490 A1 | 10/2018 | Loring et al. |

FOREIGN PATENT DOCUMENTS

| | | |
|---|---|---|
| EP | 2967697 | 4/2018 |
| EP | 3354233 | 10/2019 |
| GB | 2480846 | 12/2011 |
| JP | H11-500035 | 1/1999 |
| JP | 2006150055 | 6/2006 |
| JP | 2007518453 | 7/2007 |
| JP | 2007519477 | 7/2007 |
| JP | 2007536011 | 12/2007 |
| JP | 2011526189 | 10/2011 |
| JP | 2012518517 | 8/2012 |
| JP | 2013500810 | 1/2013 |
| JP | 2013511358 | 4/2013 |
| JP | 2014131738 | 7/2014 |
| WO | WO 9625106 | 8/1996 |
| WO | WO 0166021 A1 | 9/2001 |
| WO | WO 2005011523 A2 | 2/2005 |
| WO | WO 2006022923 | 3/2006 |
| WO | WO 2006023824 | 3/2006 |
| WO | WO2006099270 | 9/2006 |
| WO | WO 2007084846 | 7/2007 |
| WO | WO 2009158522 | 12/2009 |
| WO | WO 2010099142 | 9/2010 |
| WO | WO 2011015863 | 2/2011 |
| WO | WO 2011063281 | 5/2011 |
| WO | WO 2012116089 | 10/2011 |
| WO | WO 2011151657 | 12/2011 |
| WO | WO 2012088036 | 6/2012 |
| WO | WO 2016039762 | 3/2016 |
| WO | 2020124052 A1 | 6/2020 |

OTHER PUBLICATIONS

Search report issued for European patent application No. 13198280 dated Feb. 5, 2014.
International Search Report for International patent application No. PCT/US2014/027448 dated Jul. 7, 2014.
International Preliminary Report on Patentability issued for International patent application No. PCT/US2014/027448, Sep. 15, 2015, 8 pages.
Partial European Search Report issued in connection with European patent application No. 14768333.8, Oct. 26, 2016, 6 pages.
Patent Examination Report No. 1 issued in connection with Australian patent application No. 2015202080, Jul. 5, 2016, 4 pages.
First Office Action issued for Japanese patent application No. 2016-117842, Sep. 12, 2017, 5 pages.
First Office Action issued in connection with corresponding Japanese Patent Application No. 2020-016447, Apr. 6, 2021, 4 pages.
Office Action in corresponding Canadian Patent Application No. 2,904,652, Jun. 2, 2020, 6 pages.
First Examination Report issued in corresponding Australian Patent Application No. 2019213412, Sep. 3, 2020, 5 pages.
First Office Action in corresponding Canadian Patent Application No. 2,904,652, Jan. 28, 2020, 5 pages.
Final Office Action issued in connection with corresponding Japanese Patent Application No. 206-502443, May 15, 2018, 3 pages.
Extended European Search Report issued in connection with corresponding European Patent Application No. 18160378.8, Jun. 29, 2018, 7 pages.
Second Office Action issued in connection with corresponding Chinese Patent Application No. 2018071101785100, dated Jul. 16, 2016, 6 pages.
First Office Action in corresponding Japanese Patent Application No. 2018-178853, Sep. 3, 2018, 3 pages.
Examination Report No. 1 issued in connection with corresponding Australian Patent Application No. 20182000073, Dec. 24, 2018, 3 pages.
First Office Action issued in connection with corresponding Japanese Patent Application No. 2018-092289, Mar. 5, 2019, 2 pages.
Extended European Search Report and Opinion in connection with European Patent Application No. 14768333.8, dated Jan. 30, 2017, 10 pages. *cited in parent.
Extended European Search Report issued in connection with European Patent Application No. 22179220.3, Feb. 20, 2023, 14 pages.

* cited by examiner

Anterior side

TALAR IMPLANT

CROSS-REFERENCE TO RELATED APPLICATION

This application claims priority under 35 U.S.C. § 119(e) to U.S. Provisional Application No. 63/211,225, filed on Jun. 16, 2021, the entire contents of which are incorporated herein by reference.

FIELD OF DISCLOSURE

Disclosed is a talar dome prosthesis and the associated guide instrument useful in preparing a talus to receive the talar dome prosthesis.

BACKGROUND

Talar necrosis or talar implant subsidence can leave little to no talar body with no options left for the patient than ankle fusion or amputation. As amputation is not a particularly desirable option, fusion might be preferred by many patients. However, currently available total talar implants do not allow for fusion with either the navicular and/or calcaneus. Therefore, there is a need for a better total talar implant that allow for such fusions.

SUMMARY

Provided is a prosthesis for ankle arthroplasty. The prosthesis comprising a talar dome component configured to be attached to a talus bone. The talar dome component comprises an articulating surface for bearing toward a tibia, a mounting surface for attachment to the talus bone, wherein the mounting side includes at least three substantially flat bone-contacting surfaces that are not co-planar.

Also provided is chamfer base that is a guide for a reamer and a reciprocating saw for making desired cuts into a talus to receive the talar dome component of the present disclosure. The guide comprises:

a main body having a first end and a second end;
a pin-receiving portion provided at the first end and configured to slide over one or more guide pins placed in a bone, wherein the guide is registered at a desired position relative to the bone when the pin-receiving portion is slid over the one or more guide pins;
   wherein the main body is configured like a bridge extending from the first end to the second end over the bone and rests against the bone at the second end and defines a space under the main body between the main body and the bone;
a reamer guide portion provided on the main body, wherein the reamer guide portion comprises an outer wall defining a channel for receiving and guiding a shaft of a reamer, wherein the channel is open to the space under the main body;
a hole provided on the main body between the reamer guide portion and the pin-receiving portion, wherein the hole is sufficiently large to pass the bladed end of the shaft of the reamer through and into the space under the main body; and
wherein the outer wall of the reamer guide portion comprises a slot that connects the channel to the hole so that the shaft of the reamer that is placed in the hole can pass through the slot and be received in the channel.

A method of making the desired cuts into a talus to receive the talar dome component of the present disclosure is also provided.

DETAILED DESCRIPTION

Figure 1A:
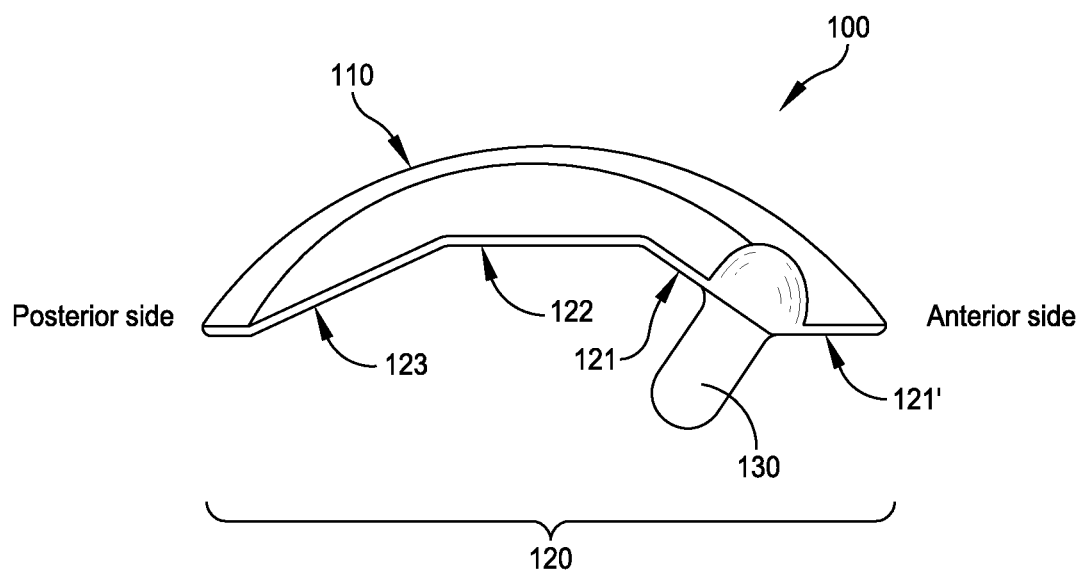
FIG. 1A is an illustration of a conventional talar dome component of a prosthesis for ankle arthroplasty.

This description of the exemplary embodiments is intended to be read in connection with the accompanying drawings, which are to be considered part of the entire written description. The drawing figures are not necessarily to scale, and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. When only a single machine is illustrated, the term "machine" shall also be taken to include any collection of machines that individually or jointly execute a set (or multiple sets) of instructions to perform any one or more of the methodologies discussed herein. The term "operatively connected" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

In total ankle replacement arthroplasty, the superior talus are resected using a bone saw. The saw cutting path is guided along slots in the fixture while aligned to the patient's anatomy. In some total ankle replacement arthroplasty, a talar dome component such as the conventional talar dome prosthesis 100 shown in FIG. 1 replaces the superior portion of a talus.

The conventional talar dome prosthesis 100 can be an integrally formed of surgical steel or titanium alloy, shaped as shown and polished on its articulating surface 110. The underside of the talar dome prosthesis 100, opposite from the articulating surface 110 is a mounting surface 120 that contacts the prepared talus surface. The mounting surface 120 of the talar dome prosthesis 100 has four flat surfaces: an anterior plantar surface 121, an anterior chamfer 122, a central plantar surface 123, and a posterior chamfer 124.

In the conventional talar dome prosthesis 100, typically two pegs 130 extend from the anterior chamfer 122 and get embedded in the talus when the talar dome prosthesis 100 is mounted on a talus.

Figure 1B:
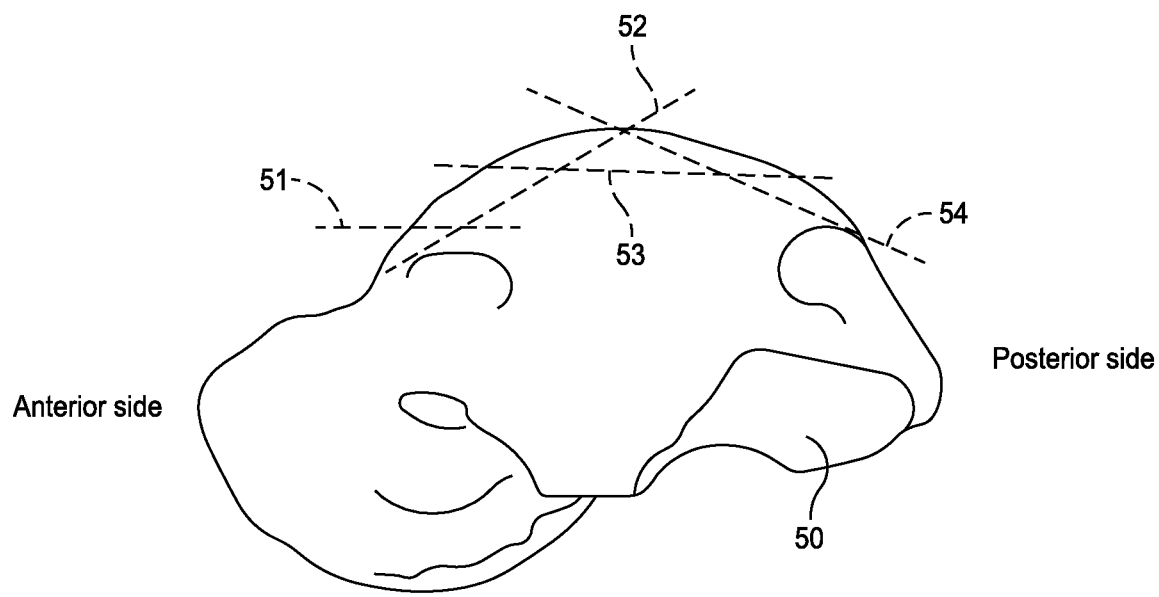
FIG. 1B is an illustration showing four resection cuts that need to be made on a talus to prepare the talus into a shape that meets the contour of the mounting surface of the talar dome prosthesis of FIG. 1A.
Figure 1C:
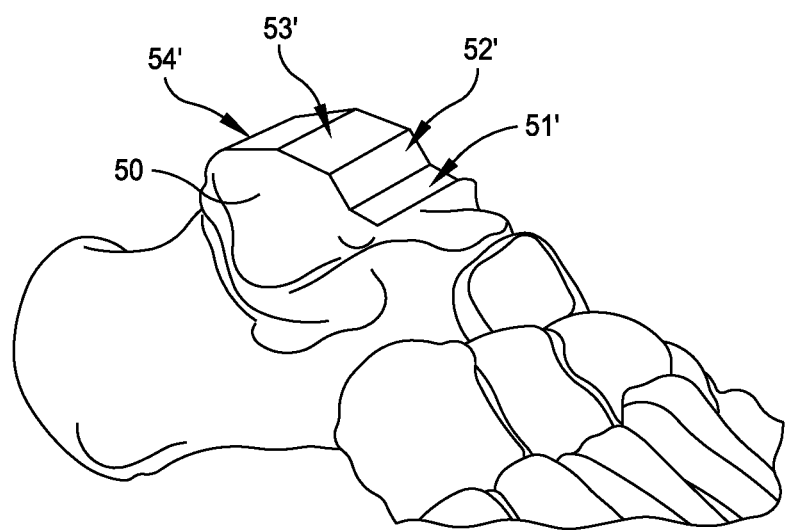
FIG. 1C is an illustration showing the medial side elevation view of a human right foot talus after the four resection cuts illustrated in FIG. 1B have been made.

Referring to FIGS. 1B and 1C, to receive the talar dome prosthesis 100, the talus is resected into a shape that complements the contour of the mounting surface 120 of the talar dome prosthesis 100. For providing the complementary surfaces on the talus 50, the talus is resected during the surgical process ankle arthroplasty. In FIG. 1B, a medial side elevation view of a human right foot talus 50 shown with planes 51, 52, 53, and 54 marked for resection. The four saw cuts are made, preferably guided by an alignment and navigation fixture with appropriate guides for the angle and transit of the surgical saw, along the lines 51, 52, 53, and 54. FIG. 1C shows the talus 50 after the cuts are made. The four cuts produce corresponding flat surfaces 51', 52', 53', and 54' on the superior portion of the talus 50. These flat surfaces complement the four flat surfaces: the anterior plantar surface 121, the anterior chamfer 122, the central plantar surface 123, and the posterior chamfer 124 on the mounting surface 120 of the talar dome prosthesis 100. However, because the anterior end of the talar dome prosthesis 100 has the two flat surfaces, the anterior plantar surface 121 and the anterior chamfer 122, that are not coplanar, the surgical procedure forming the corresponding flat surfaces 51' and 52' on the talus requires multiple cutting steps. Thus, a talar prosthesis configuration that can simplify the talus preparation procedure is desired.

Figure 2A:
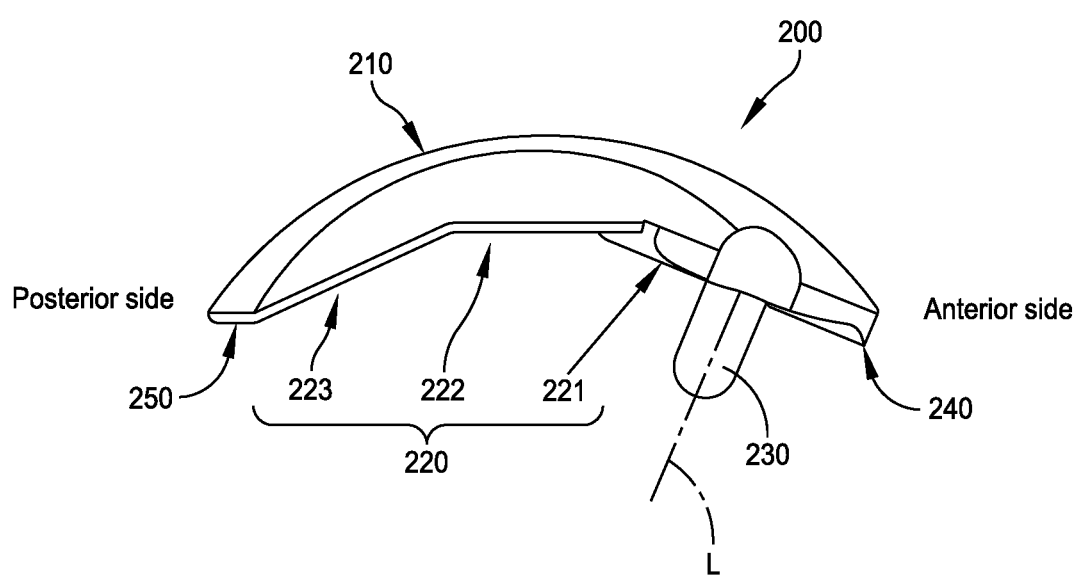
FIGS. 2A-2C are illustrations of a talar dome component of a prosthesis for ankle arthroplasty according to an embodiment of the present disclosure.
Figure 2B:
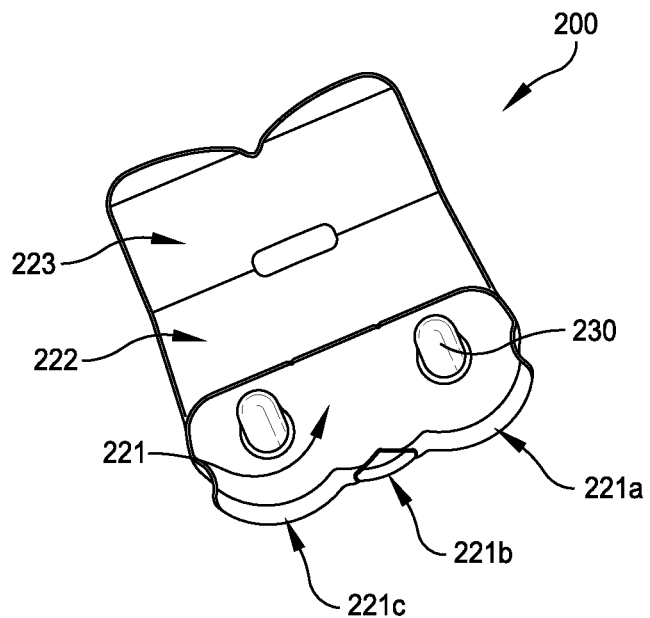
Figure 2C:
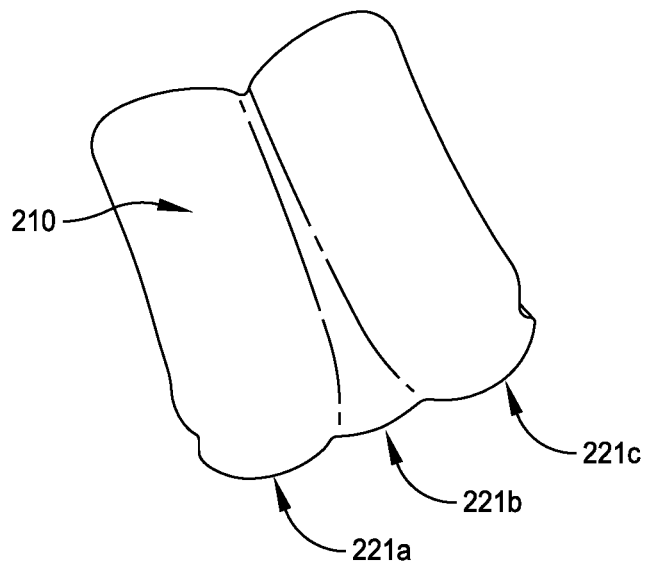

Referring to FIGS. 2A-2C, according to the present disclosure, an improved prosthesis for ankle arthroplasty is disclosed. The prosthesis includes a talar dome component 200 configured to be attached to a talus bone. The talar dome component 200 comprises: an articulating surface 210 for bearing toward a tibia; and a mounting surface 220 for attachment to the talus bone, where the mounting surface 220 comprises at least three substantially flat bone-contacting surfaces 221, 222, 223 that are not co-planar. In the illustrated example, three substantially flat bone-contacting surfaces 221, 222, 223 are shown. The three bone-contacting surfaces comprise an anterior sloped surface 221, a central plantar surface 222, and a posterior sloped surface 223. Here, the terms anterior and posterior reflect the orientation of the talar dome component 200 when attached to the talus bone. The anterior sloped surface 221 can be inclined upwardly from an inferior front edge 240 to the central plantar surface 222. The posterior sloped surface 223 can be inclined downward from the central plantar surface 222 to an inferior rear edge 250. The at least one peg 230 extends from the anterior chamfer 221.

In some embodiments of the prosthesis, when the talar dome component 200 is attached to the talus bone, the three bone-contacting surfaces 221, 222, 223 engage and abut against corresponding resected surfaces of the talus bone having a shape that is complementary with the three bone-contacting surfaces. Because there are only three substantially flat bone-contacting surfaces 221, 222, 223, the procedure for preparing the talus bone to receive the inventive talar dome component 200 can be simpler than the prior art procedure because only three corresponding flat surfaces need to be prepared on the talus bone. In other words, the preparation of the talar bone for receiving the talar dome component 200 requires fewer cuts into the talus bone. Thus the surgical procedure for preparing the talus bone is substantially simpler than that required for the prior art talar dome component 100.

Figure 3A:
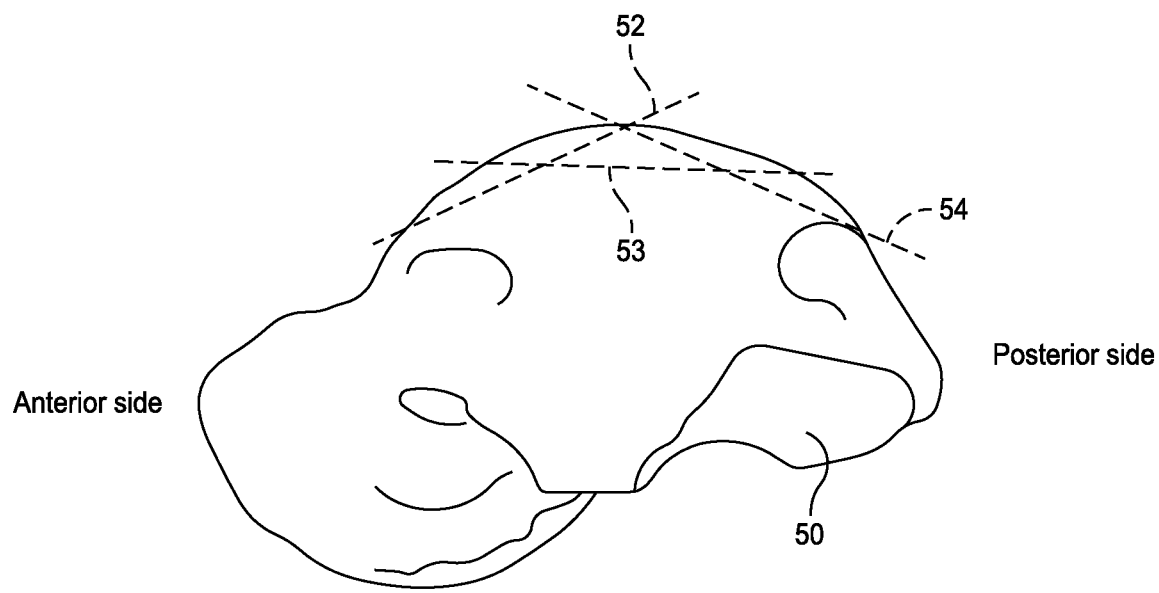
FIG. 3A is an illustration showing three resection cuts that need to be made on a talus to prepare the talus into a shape that meets the contour of the mounting surface of the inventive talar dome prosthesis of FIG. 2A.
Figure 3B:
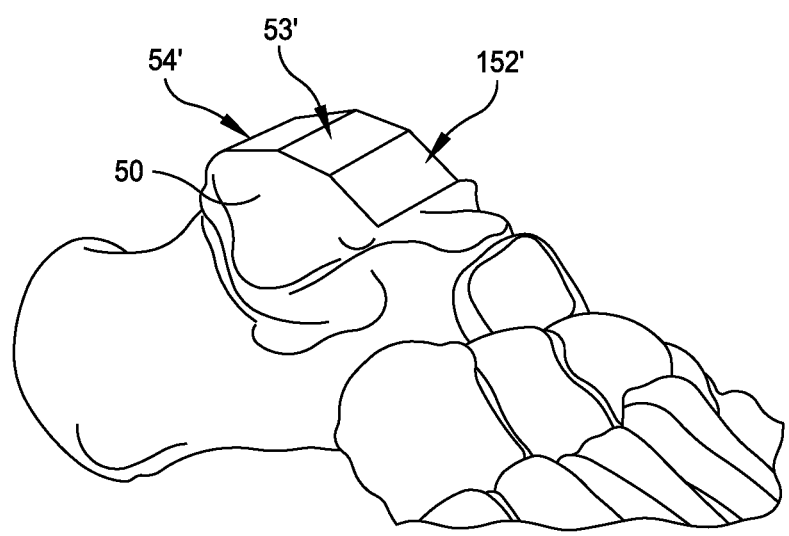
FIG. 3B is an illustration showing the medial side elevation view of a human right foot talus after the three resection cuts illustrated in FIG. 3A have been made.
Figure 3C:
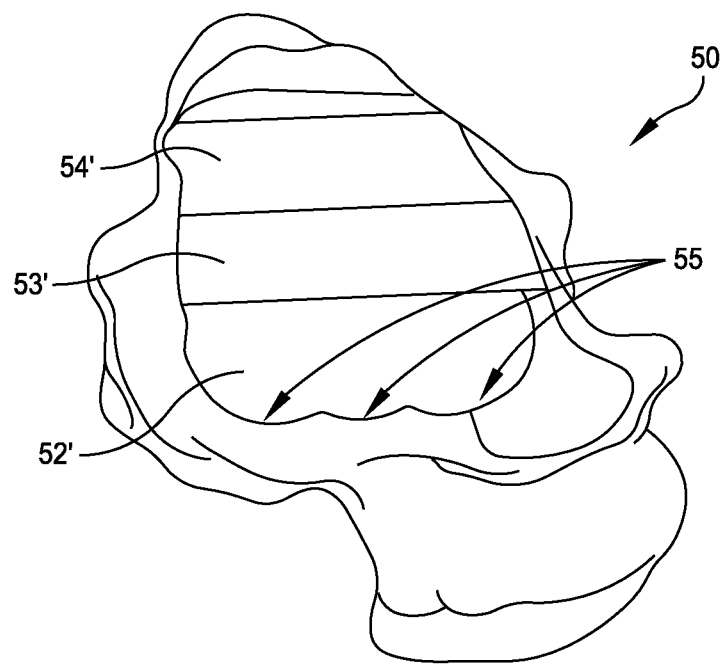
FIG. 3C is an illustration showing a talus that has been resected to receive the talar dome prosthesis component of the present disclosure.

Referring to FIG. 3A, the resection cuts made into the talus to receive the talar dome component 200 consists of three cuts: the anterior chamfer cut 152, the central flat cut 53, and the posterior chamfer cut 54, thus simplifying the procedure for preparing the talus. Referring to FIGS. 3B-3C, the anterior chamfer cut 152 produces a flat anterior chamfer surface 152' on the talus bone that will received the anterior sloped surface 221 of the talar dome component 200. The central flat cut 53 produces a central flat surface 53' on the talus bone that will receive the central plantar surface 222 of the talar dome component 200. The posterior chamfer cut 54 produces a flat posterior chamfer surface 224 on the talus bone that will receive the posterior sloped surface 223 of the talar dome component 200.

Additionally, referring to FIGS. 2B and 2C, the anterior end of the anterior sloped surface 221 is shaped to match the shape of the anterior chamfer surface 152' made in the talus by just three insertions by a reamer 500. As shown in FIG. 3C, the anterior edge of the anterior chamfer surface 152' has three lobes 55 formed by the cutting procedure accomplished by three insertions by the reamer. FIGS. 2B and 2C show the anterior end of the talus dome component 200 having three lobed edge portions 221a, 221b, and 221c that match the shape of the three lobes 55 of the anterior chamfer surface 152' on the talus. The procedure of making the anterior chamfer surface 152', the central flat surface 53', and the posterior chamfer surface 54' is described in more detail below.

The talar dome component 200 can further include at least one peg 230 rigidly protruding from one of the three bone-contacting surfaces. The peg 230 can be configured for being embedded into a surface of the talus bone. The peg 230 can be located concentric with any of the anterior reamer guide locations described herein in connection with the reamer guide portion 420 of the chamfer base 400.

In some embodiments of the prosthesis, the talar dome component 200 can have a one-piece construction with the at least one peg 230 being integral with the talar dome component. In some embodiments, the peg 230 can have a substantially cylindrical shape and have a circular cross-section. In other embodiments, the peg 230 can be shaped to have any desired non-circular geometric cross-section, such as a square, rectangle, triangle, oval, crucifix, etc. When there are more than one peg 230, the pegs on a given talar dome component 200 do not necessarily have to have the same shape and each peg 230 can have different shape.

Referring to FIG. 2A, in some embodiments, the at least one peg 230 is oriented such that its longitudinal axis L is perpendicular to the anterior chamfer 221.

In some embodiments, a porous coating such as sintered titanium alloy particles as in Wright Medical Technology BIOFOAM® (not shown) can be applied to the bond-contacting flat surfaces 221, 222, and 223 to improve prospects for bone ingrowth. The at least one peg 230 can also be coated with the porous coating.

Exemplary Method for Preparing the Talus

Figure 4A:
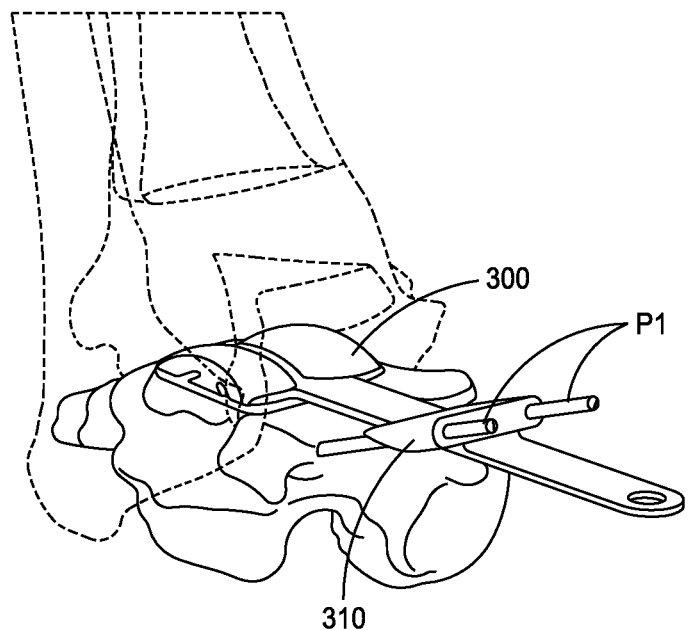
FIGS. 4A-4L illustrate an example of a procedure for preparing the talus to receive the talar dome prosthesis component according to the present disclosure.

The procedure for preparing the talus for the talus dome component 200 will now be described in more detail referring to the FIGS. 4A-4N. Referring to FIG. 4A, after the cut along the line 53 (see FIG. 3A) is made in the talus to remove a portion of the natural talar dome, a talus dome trial 300 is inserted from the anterior side of the ankle joint space and positioned over the resected bone surface, the central flat surface 53', to determine the proper location for guide pins P1 that will be used to position a chamfer base 400 at a proper location.

Referring to FIGS. 4A-4N, according to an aspect of the present disclosure, the chamfer base 400 can be configured as a one-piece jig (one for a particular geometry of bone preparation for a talus dome component 200) that is configured to guide a reamer and a saw blade to make the anterior chamfer cut 152 and the posterior chamfer cut 54. The chamfer base 400 is further configured to drill holes in the resulting anterior chamfer surface 152' for receiving the one or more pegs 230.

The chamfer base 400 as a guide comprises a main body 401 having a first end and a second end. During use, when the chamfer base 400 is positioned over the central flat surface 53' of the resected talus, the first end is the anterior end and the second end is the posterior end. The chamfer base 400 also comprises a pin-receiving portion 410 provided at the first end and is configured to slide over one or more guide pins P1 placed in a talus; a reamer guide portion 420 provided on the main body 401; and a hole 430 provided on the main body between the reamer guide portion 420 and the pin-receiving portion 410.

When the pin-receiving portion 410 is slid over the one or more guide pins P1 that are placed at the desired locations using the talus dome trial 300, the chamfer base 400 is registered at a desired position relative to the central flat surface 53' of the resected talus. The main body 401 can be configured like a bridge extending posteriorly from the first end (anterior end) to the second end (posterior end) over the central flat surface 53' and rests against the bone at the second end and defines a space S under the main body 401 between the main body and the central flat surface 53'. This configuration can be seen in the views provided in FIGS. 4B-4F.

In some embodiments, the posterior end of the bridge-like main body 401 comprises a footing 402 that is configured to rest on the central flat surface 53' and help stabilize the main body's seating on the central flat surface 53'. In some embodiments, the footing 402 comprises a secondary chamfer depth stop control surface 402s at the anterior facing end of the footing 402. The secondary chamfer depth stop control surface 402s is labeled in FIGS. 4D and 4E. The secondary chamfer depth stop control surface 402s is positioned to stop the bladed end 515 of the reamer 500 from advancing too deep into the talus.

In an embodiment, the reamer guide portion 420 comprises an outer wall defining a channel 421 for receiving and guiding a shaft 505, 507 of a reamer 500 at a predetermined first angle with respect to the central flat surface 53'. The channel 421 is open to the space S under the main body. The reamer 500 comprises a set of reamer blades at its bladed end 515. The cutting blades at the bladed end 515 are orthogonally oriented to the longitudinal axis of the shaft 505, 507 and will cut a surface in a plane that is oriented at a second angle. The plane of the cut surface is at a second angle with respect to the central flat surface 53' where the plane of the cut surface is orthogonal to the longitudinal axis of the shaft 505, 507. The second angle is thus 90 degrees apart from the predetermined first angle.

The hole 430 is sufficiently large to pass the bladed end 515 of the shaft of the reamer 500 through and into the space S under the main body 401.

The outer wall of the reamer guide portion 420 comprises a slot 425 that connects the channel 421 to the hole 430 so that the shaft 505, 507 of the reamer 500 that is placed in the hole 430 can pass through the slot 425 and be received in the channel 421.

To properly position the chamfer base 400 on the resected talus, once the talus dome trial 300 is in place, guide pins P1 are placed through a pin guide portion 310 of the talus dome trial 300 and into an anterior portion of the talus. The pin guide portion 310 is configured to guide the pins P1 into the talus at an angle that is sufficiently shallow so that the pins do not interfere with anything and can be maintained throughout all chamfer cutting steps. Once the guide pins P1 are in place, the talus dome trial 300 is removed leaving behind the guide pins P1 in place. Preferably, two guide pins P1 are used but in some embodiments one guide pin can be sufficiently used.

Figure 4B:
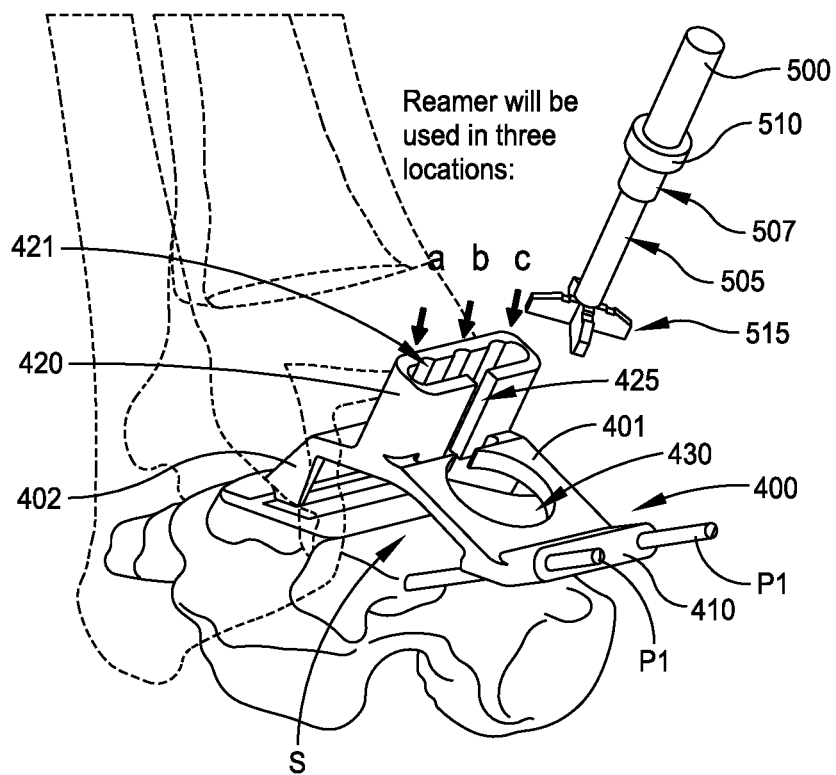

Referring to FIG. 4B, after the talus dome trial 300 is removed, the pin-receiving portion 410 of the chamfer base 400 is slid over the one or more guide pins P1 as shown. This step locates or registers the chamfer base 400 into a proper position over the central flat surface 53' of the resected talus.

The outer wall of the reamer guide portion 420 can be configured to guide the reamer 500 at the first angle to make the anterior chamfer cut 152 (see FIG. 3A) in the talus and form the anterior chamfer surface 152'. The reamer guide portion 420 can be configured to guide the reamer 500 at two or more locations along the width of the reamer guide portion 420, each location representing a location for reaming procedure. For example, for a narrower talus dome component 200 for a narrower talus bone, fewer reamer guiding locations could be sufficient, while a wider talus dome component 200 for a wider talus bone may require more than two reamer guiding locations to ream the full width of the talus bone. The illustrated example reamer guide portion 420 is configured with three reamer guiding locations indicated by the three arrows a, b, and c. In some embodiments, the reamer guiding locations need not be arranged in a straight line. Some reamer guiding locations could be located more "anterior" or "posterior".

Figure 4C:
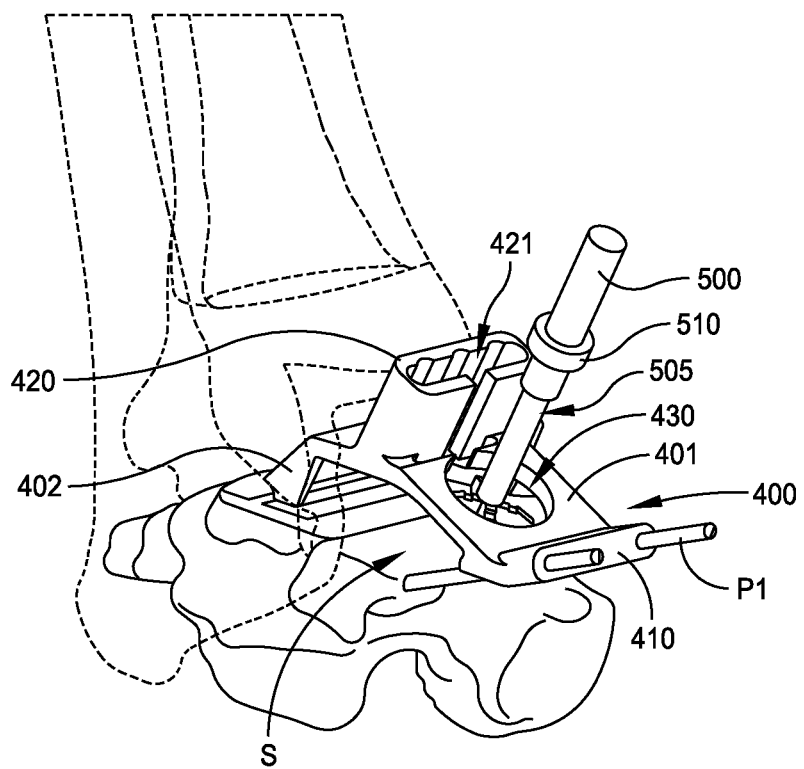
Figures 4D, 4E:
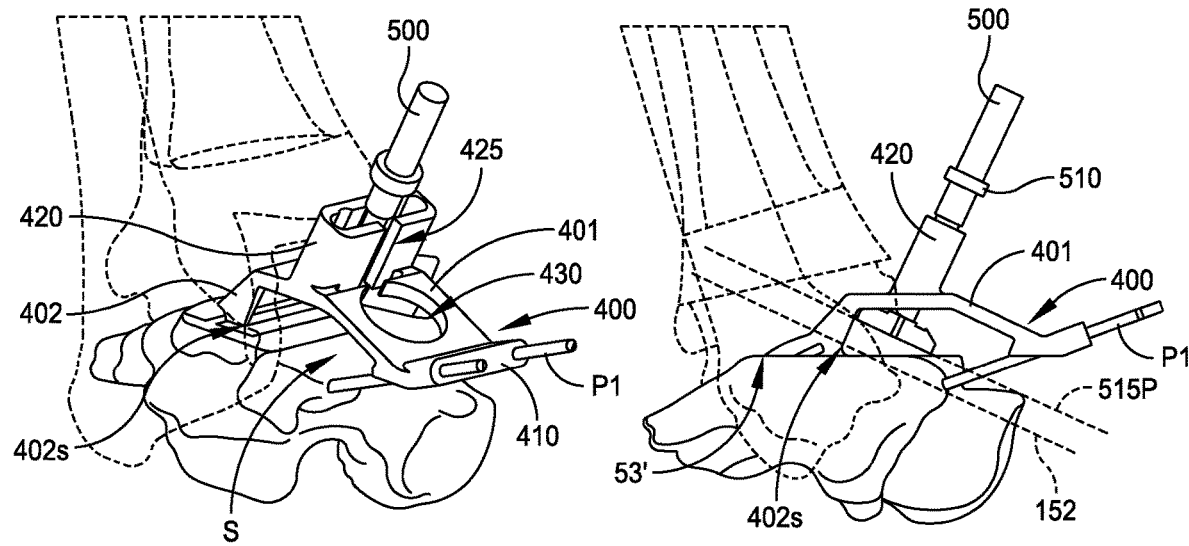

As can be seen in FIG. 4E, the space S formed under the main body 401 of the chamfer base 400 accommodates the bladed end 515 of the reamer 500 and provides a clearance to allow the reamer 500 to be moved between the possible positions a, b, and c without being obstructed by the underlying central flat surface 53' before the reamer's bladed end 515 is plunged into the talus bone to make the anterior chamfer cut 152.

The reamer guide portion 420 can be angled so that when the reamer 500 is positioned within the guide portion as shown in FIGS. 4D and 4E, the cutting plane 515P defined by the ends of the reamer's bladed end 515 is parallel to the plane of the anterior chamfer cut 152. Thus, when the reamer 500 is advanced toward the talus bone guided by the reamer guide portion 420 and the reamer's bladed end 515 plunge into the talus bone, the reamer blades cut the bone and form at least a portion of the flat anterior chamfer surface 152'. By repeating this reaming procedure at two or more of the locations a, b, and c guided by the reamer guide portion 420, the full anterior chamfer surface 152' can be formed in the talus bone.

Once the reamer 500 is in the channel 421 of the reamer guide portion 420, the reamer 500 can be located and plunged into the talus at two or more of the locations a, b, c to form the anterior chamfer cut 52' in the talus.

According to some embodiments, the reamer 500 can comprise a shaft and the bladed end 515 at one end of the shaft. The shaft can comprise a wider shoulder region 510, and a stepped portion (the portion that includes 505 and 507), wherein the stepped portion includes a larger diameter portion 507 and a smaller diameter portion 505. In some embodiments, the larger diameter portion 507 is closer to the wider shoulder region 510 and the rest of the shaft between the larger diameter portion 507 and the bladed end 515 being the smaller diameter portion 505 as shown in the illustrated example of the reamer 500 of FIGS. 4B-4J.

The larger shoulder region 510 is configured as a depth stop located at a set distance away from the reamer bladed end 515 to control the maximum depth the reamer blades can be plunged/cut into the bone.

The illustrated example of the larger shoulder region 510 as a depth stop is a larger diameter collar but any type of protrusion can be provided on the shaft to form the depth stop. For example, the depth stop can be configured as a cone shaped surface, a cross-pin, or other bump, etc. The larger shoulder region 510 provides a mechanical obstruction that will butt up against the top of the reamer guide portion 420 and stop the reamer 500 from being advanced further into the talus bone.

The smaller diameter portion 505 provides more clearance between the reamer's shaft and the channel 421 of the reamer guide portion 420 to allow for easier movement of the reamer within the channel 421. The larger diameter portion 507 provides less clearance between the reamer's shaft and the channel 421 of the reamer guide portion 420 for improved location control of the reamer within the channel 421. The clearance provided by the larger diameter portion 507 can be the minimum clearance needed between the reamer's shaft and the channel 421 to minimize the slop while the reamer 500 is being operated within the reamer guide portion 420. This feature can provide easier movement of the reamer 500 within the channel 421 of the reamer guide portion 420 when the reamer 500 is pulled away from the talus and being moved to a different reaming location. Then, as the reamer 500 is moved toward the talus to plunge the reamer blades 515 into the bone, the larger diameter portion 507 enters the channel 421 and helps maintain the reamer at the selected location because there is less clearance between the larger diameter portion 507 and the sidewalls of the reamer guide portion 420.

As mentioned above, in some embodiments, the reamer guiding locations need not be arranged in a straight line and some reamer guiding locations could be located more "anterior" or "posterior". This may be achieved by using a reamer whose shaft has a diameter that is sufficiently small so that there is a large enough clearance between the reamer shaft and the sidewalls of the channel 421 to adjust the locations of the reaming within the channel 421 so that they are not in a linear arrangement.

Figure 4F:
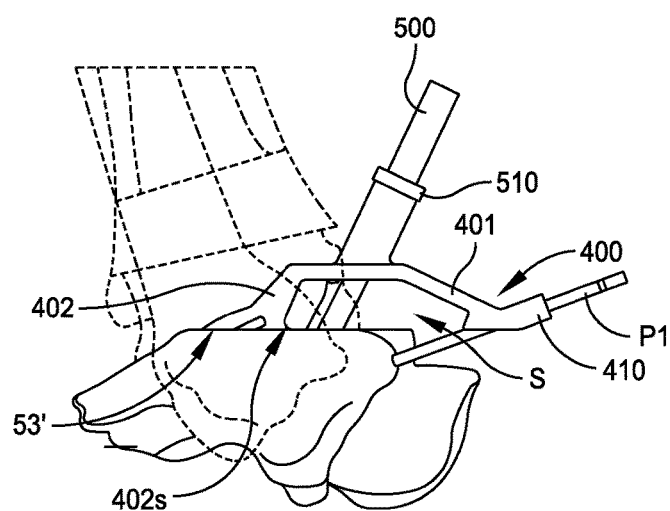

FIGS. 4C-4D are sequential illustrations showing how the reamer 500 can be positioned into the reamer guide portion 420. In the example illustrated in FIG. 4D, the reamer 500 is in the location b (the center location) within the reamer guide 420. FIG. 4E is an elevation view of the arrangement of FIG. 4D where the reamer bit 500 has not yet been plunged into the talus. FIG. 4F is an elevation view in which the reamer bit is plunged into the talus and making a cut for the anterior chamfer cut 52' in the talus.

In the embodiment where the reamer 500 is provided with the larger shoulder region 510 as a depth stop, as the reamer 500 is advanced into the talus bone the depth stop 510 bottoms out against the top of the reamer guide portion 420 to ensure that a proper depth is achieved with the reamer 500.

Once a desired reaming depth is reached, the reamer 500 is pulled back and moved over to one of the other two locations a or c. In some other embodiments, the reaming procedure can start at locations a or c first then move to one or more of the other two locations for the next reaming step.

Figure 4G:
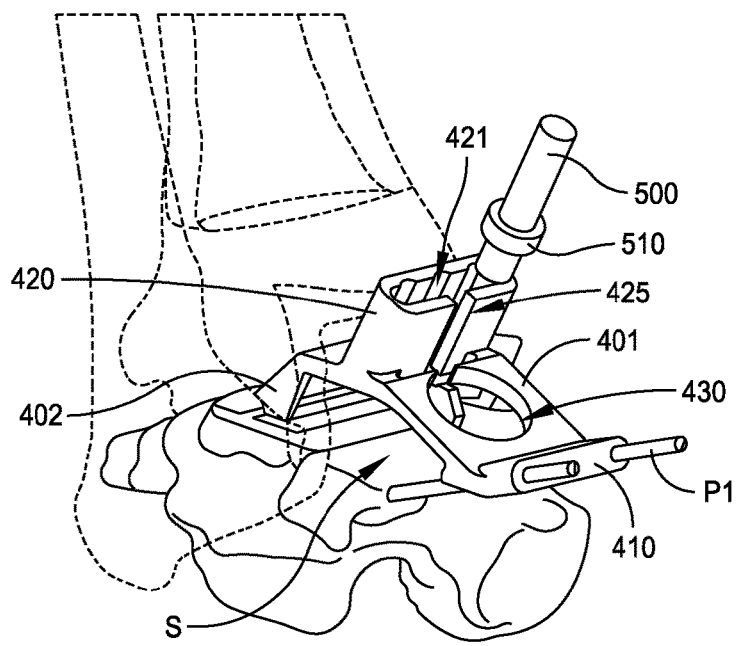
Figures 4H, 4I:
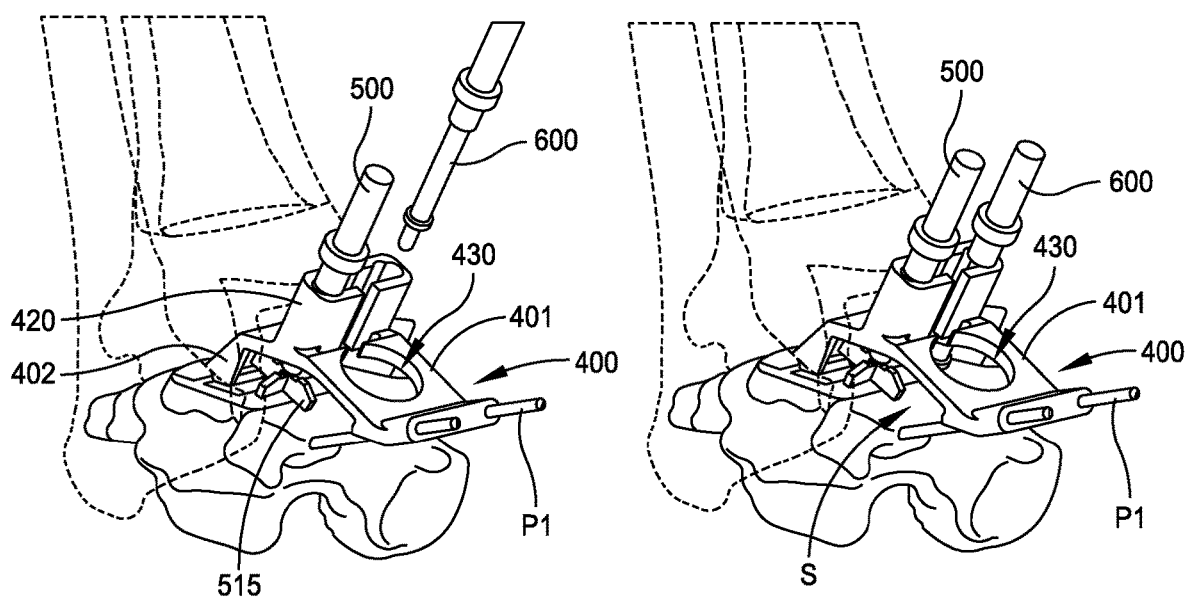
Figure 4J:
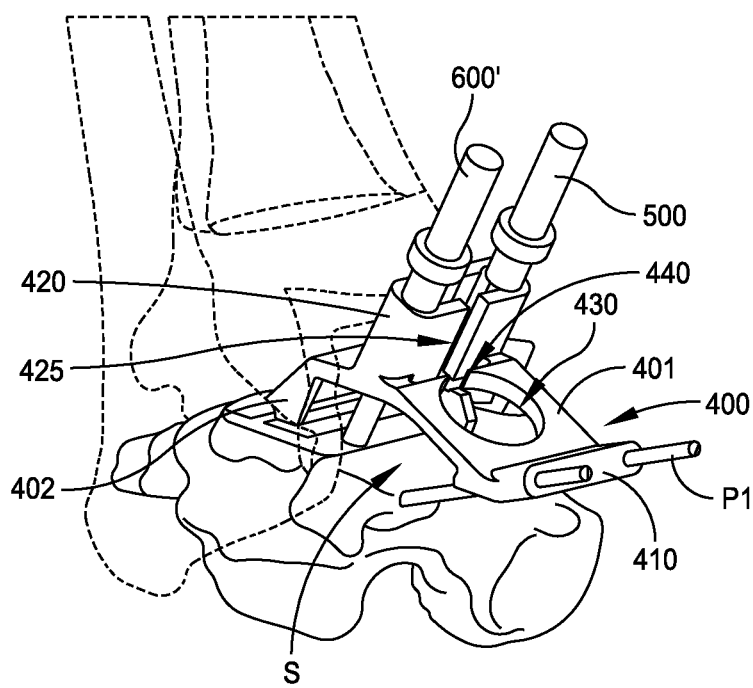

FIG. 4G is an illustration showing the reamer 500 positioned at the location c (the medial side) within the reamer guide portion 420 before reaming the talus at that location. Next, the reamer 500 is plunged into the talus to make the cut for the anterior chamfer surface 152'. Once the cut is made in the location c, the reamer 500 is pulled back and then moved over to the location a (the lateral side). FIG. 4H shows the reamer 500 at the location a within the reamer guide portion 420 before it is plunged into the talus.

In some embodiments, the reamer 500 can be plunged into the talus to make the next cut for the anterior chamfer surface 152'. If two reaming procedure at the locations a and c are sufficient to complete the anterior chamfer surface 152', the reaming procedure is now complete. If a third reaming at the third location b is necessary, the reamer 500 can be moved over to the location b for further reaming step. Perhaps a narrower talar dome component 200 needs fewer reamer locations while a wider talar dome component 200 would require more.

After the reaming procedures are complete, holes for receiving the one or more pegs 230 can be drilled into the anterior chamfer surface 152' using the reamer guide portion 420 as a guide for a peg-drill 600. FIGS. 4H-4I show a peg-drill 600 being inserted through the reamer guide portion 420 to drill a hole into the anterior chamfer surface 152'. For the embodiment of the talar dome component 200 having more than one peg 230, the drilling step would be repeated for each peg location.

The peg-drill 600 is a drill bit can comprise a shaft, and a bone-cutting fluted portion at one end of its shaft. As shown in FIG. 4H, the shaft of the peg-drill 600 can be configured to have the similar structure as that described above for the reamer 500. Thus, in describing the structures of the shaft of the peg-drill 600, the reference numbers referring to the corresponding analogous structure on the shaft of the reamer 500 will be referenced. The shaft of the peg-drill 600 can comprise a larger shoulder region (like 510), and a stepped portion (like 505, 507). The stepped portion can include a larger diameter portion (like 507) and a smaller diameter portion (like 505). The larger shoulder region (like 510) is configured as a depth stop located at a set distance away from the bone-cutting fluted portion to control the maximum depth the drill 600 can cut into the bone. The smaller diameter portion (like 505) provides a smaller clearance between the drill's shaft and the channel 421 of the reamer guide portion 420 to allow for easier insertion of the drill 600 into the channel 421. The larger diameter portion (like 507) provides less clearance between the drill's shaft and the channel 421 for improved location control of the drill within the channel.

In some embodiments, the peg-drill 600 can be used as a temporary anchor to provide additional stability for the chamfer base 400 before the reamer 500 is used. For example, in FIG. 4I, a peg-drill 600 is placed into the medial side of the reamer guide portion 420 at location c, drilled into the talus and left in place to provide additional stability for the chamfer base 400. In other words, the peg-drill 600 can be used like a guide pin. Next, a reaming step can be carried out using the reamer 500 positioned at the anterior side of the reamer guide portion 420 at location a while the peg-drill 600 is providing additional stabilization of the chamfer base 400.

Figure 4K:
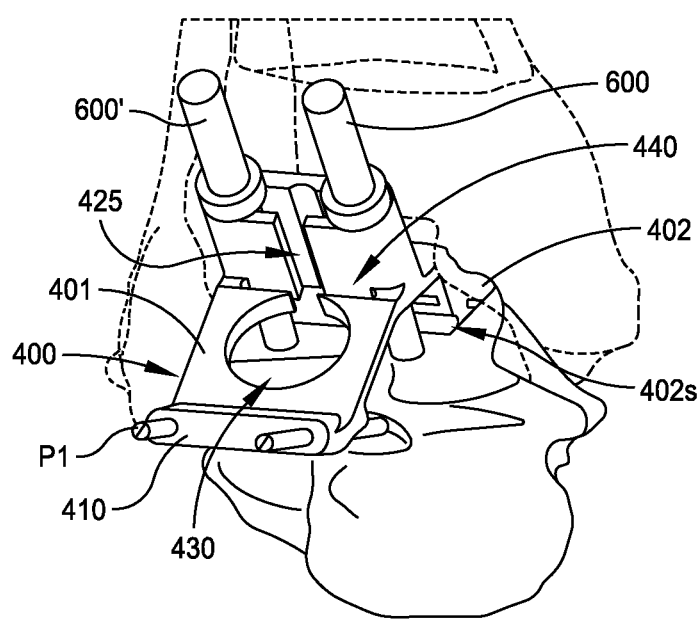

Once the anterior chamfer surface 152' is formed, the posterior chamfer cut 54 is made to form the posterior chamfer surface 54'. Referring to FIG. 4K, the posterior chamfer cut 54' can be made using a reciprocating saw blade inserted through the saw blade guide slot 440 (labeled in FIGS. 4J and 4K) in the chamfer base 400 and sweeping the saw blade in medial-lateral directions. The saw blade guide slot 440 is configured to guide the saw blade at a third angle with respect to the central flat surface 53' that is a proper angle to make the posterior chamfer cut 54. The saw blade guide slot 440 is provided in the main body 401 on the anterior side of the reamer guide portion 420 between the reamer guide portion 420 and the pin-receiving portion 410 so that the reciprocating saw blade can be inserted into the saw blade guide slot 440 from the anterior side of the talus without either the reamer guide portion 420 or the pin-receiving portion 410 from obstructing the saw blade's approach. In a preferred embodiment, the saw blade guide slot 440 is located between the reamer guide portion 420 and the hole 430 as illustrated.

In some embodiments, the peg-drills can be used to provide enhanced stabilization of the chamfer base 400 while the posterior chamfer cut 54 is being made. For example, as shown in FIG. 4I, two peg-drills 600, 600' can be left in place after they are used to drill holes in the anterior chamfer surface 152' to stabilize the chamfer base 400. Then, the saw blade can be inserted through the saw blade guide slot 440 in between the two peg-drills 600, 600' to make the posterior chamfer cut 54.

Figure 4L:
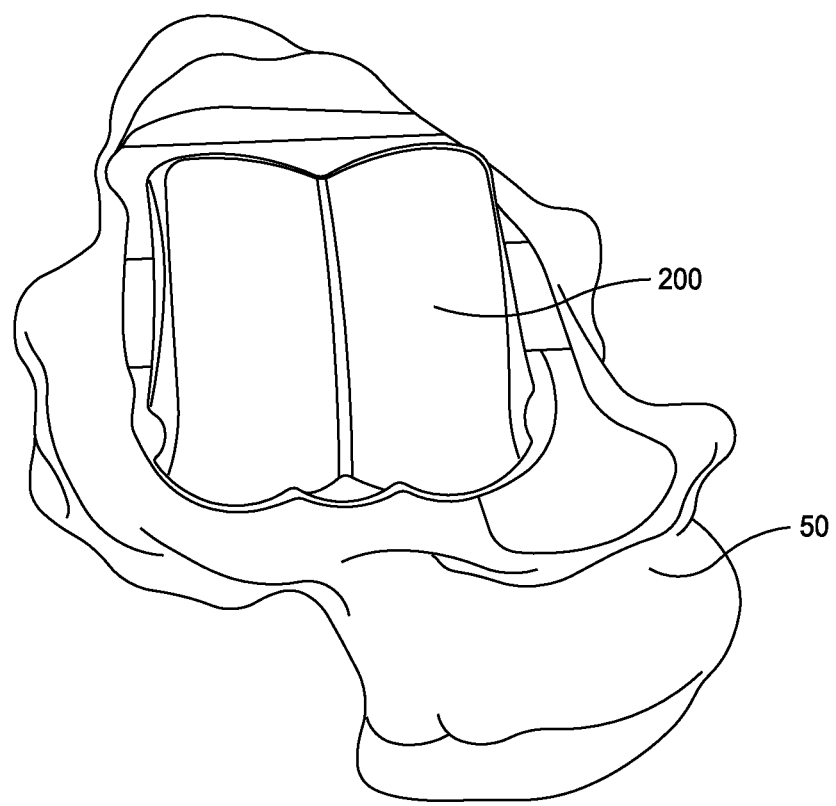

In some embodiments, if the chamfer base 400 is sufficiently securely held in position by the pins P1, sawing procedure can be carried out without using the peg-drills 600, 600' as stabilizers. FIG. 4L is an illustration showing the talar dome component 200 of the present disclosure mounted on a talus 50 after the talus has been resected according to the procedures described above.

According to another aspect of the present disclosure, a surgical kit comprising one or more of the chamfer base 400, and one or more of the reamer 500 is disclosed. In some embodiments, the surgical kit can comprise or more of the chamfer base 400, one or more of the reamer 500, and one or more of the peg-drill 600 is disclosed. When there are more than one chamfer base 400 provided in a kit, each chamfer base can be of different size. When there are more than one reamer 500 provided in a kit, each reamer 500 can be of different size. When there are more than one peg-drill 600 provided in a kit, each peg-drill 600 can be of different size.

Although the devices, kits, systems, and methods have been described in terms of exemplary embodiments, they are not limited thereto. Rather, the appended claims should be construed broadly, to include other variants and embodiments of the devices, kits, systems, and methods, which may be made by those skilled in the art without departing from the scope and range of equivalents of the devices, kits, systems, and methods.

I claim:

1. A guide comprising:
   a main body having a first end and a second end;
   a pin-receiving portion provided at the first end and configured to slide over one or more guide pins placed in a bone, wherein the guide is registered at a desired position relative to a resected flat surface of the bone when the pin-receiving portion is slid over the one or more guide pins;
   wherein the main body is configured as a bridge extending from the first end to the second end over the resected flat surface of the bone and rests against the resected flat surface of the bone at the second end and defines a space under the main body between the main body and the bone wherein the second end of the main body comprises a footing that rests against the bone to help stabilize the main body's seating on the bone;
   a reamer guide portion provided on the main body, wherein the reamer guide portion comprises an outer wall defining a channel for receiving and guiding a shaft of a reamer at a first angle so that a bladed end of the shaft of the reamer would cut into the bone at a second angle that is orthogonal to the first angle, wherein the channel is open to the space under the main body; and
   a hole provided on the main body between the reamer guide portion and the pin-receiving portion, wherein the hole is sufficiently large to pass a bladed end of the shaft of the reamer through and into the space under the main body;
   wherein the outer wall of the reamer guide portion comprises a slot that connects the channel to the hole so that the shaft of the reamer that is placed in the hole can pass through the slot and be received in the channel; and
   wherein the first angle and the second angle are measured with respect to the resected flat surface of the bone.

2. The guide of claim 1, wherein the footing further comprises a secondary chamfer depth stop control surface that is positioned to stop the bladed end of the reamer from advancing too deep into the bone during a reaming procedure.

3. A kit comprising the guide of claim 1, and a reamer which includes: a shaft; and a set of reamer blades at one end of the shaft,
   wherein the shaft comprises a larger shoulder region, and a stepped portion, wherein the stepped portion includes a larger diameter portion and a smaller diameter portion,
   wherein the larger shoulder region is configured as a depth stop located at a set distance away from the reamer blades to control a maximum depth the reamer blades can cut into the bone,
   wherein the smaller diameter portion provides clearance between the reamer's shaft and the channel of the reamer guide portion to allow for easier insertion of the reamer into the channel, and the larger diameter portion provides less clearance between the reamer's shaft and the channel for improved location control of the reamer within the channel.

4. The kit of claim 3, further comprising a drill for preparing holes in the bone for implant pegs, wherein the drill comprises: a shaft; and a bone-cutting fluted portion at one end of the shaft,
   wherein the shaft comprises a larger shoulder region, and a stepped portion, wherein the stepped portion includes a larger diameter portion and a smaller diameter portion, wherein the larger shoulder region is configured as a depth stop located at a set distance away from the bone-cutting fluted portion to control a maximum depth the drill can cut into the bone, wherein the smaller diameter portion provides clearance between the drill's shaft and the channel of the reamer guide portion to allow for easier insertion of the drill into the channel, and the larger diameter portion provides less clearance between the drill's shaft and the channel for improved location control of the drill within the channel.

5. A guide comprising:

a main body having a first end and a second end;

a pin-receiving portion provided at the first end and configured to slide over one or more guide pins placed in a bone, wherein the guide is registered at a desired position relative to a resected flat surface of the bone when the pin-receiving portion is slid over the one or more guide pins;

wherein the main body is configured like a bridge extending from the first end to the second end over the resected flat surface of the bone and rests against the resected flat surface of the bone at the second end and defines a space under the main body between the main body and the bone;

a reamer guide portion provided on the main body, wherein the reamer guide portion comprises an outer wall defining a channel for receiving and guiding a shaft of a reamer at a first angle so that a bladed end of the shaft of the reamer would cut into the bone at a second angle that is orthogonal to the first angle, wherein the channel is open to the space under the main body; and a hole provided on the main body between the reamer guide portion and the pin-receiving portion, wherein the hole is sufficiently large to pass a bladed end of the shaft of the reamer through and into the space under the main body;

wherein the outer wall of the reamer guide portion comprises a slot that connects the channel to the hole so that the shaft of the reamer that is placed in the hole can pass through the slot and be received in the channel; and wherein the first angle and the second angle are measured with respect to the resected flat surface of the bone; further comprising a saw blade guide slot provided between the reamer guide portion and the pin-receiving portion to guide a saw blade for cutting into the bone at a third angle that is measured with respect to the resected flat surface of the bone.

* * * * *